US 8,194,139 B2

(12) United States Patent
Ide

(10) Patent No.: US 8,194,139 B2
(45) Date of Patent: Jun. 5, 2012

(54) ELECTRONIC STILL CAMERA AND METHOD OF IMAGE ACQUISITION OF ELECTRONIC STILL CAMERA

(75) Inventor: Hisato Ide, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/385,853

(22) Filed: Apr. 22, 2009

(65) Prior Publication Data

US 2009/0207280 A1  Aug. 20, 2009

Related U.S. Application Data

(63) Continuation of application No. 11/055,117, filed on Feb. 11, 2005, now abandoned.

(30) Foreign Application Priority Data

Mar. 4, 2004 (JP) .................. 2004-060341

(51) Int. Cl.
*H04N 5/228* (2006.01)
*H04N 5/262* (2006.01)

(52) U.S. Cl. ......... 348/208.14; 348/208.13; 348/208.99; 348/239; 348/240.99

(58) Field of Classification Search ............... 348/208.6, 348/240.99–240.2, 239, 208.13, 208.14, 348/169–172
See application file for complete search history.

(56) References Cited

U.S. PATENT DOCUMENTS

| | | | |
|---|---|---|---|
| 5,978,519 A * | 11/1999 | Bollman et al. | 382/282 |
| 6,298,157 B1 | 10/2001 | Wilensky | |
| 6,654,506 B1 | 11/2003 | Luo et al. | |
| 6,654,507 B2 | 11/2003 | Luo | |
| 7,133,571 B2 * | 11/2006 | Cheatle | 382/282 |
| 2005/0012833 A1* | 1/2005 | Yokota et al. | 348/240.99 |
| 2005/0206784 A1* | 9/2005 | Li et al. | 348/441 |

FOREIGN PATENT DOCUMENTS

| | | |
|---|---|---|
| JP | A-07-110429 | 4/1995 |
| JP | A-2001-236497 | 8/2001 |

* cited by examiner

*Primary Examiner* — Sinh Tran
*Assistant Examiner* — Christopher K Peterson
(74) *Attorney, Agent, or Firm* — Oliff & Berridge, PLC

(57) ABSTRACT

A photography mode selecting section allows a photographer to select continuous photographing. An imaging section captures an image of a subject. An area setting section detects a photographic subject based on a photographic image captured by the imaging section for every photographing in the continuous photographing, and sets the size and position of a photographic subject area including the detected photographic subject, when the continuous photographing is selected by the photography mode selecting section. A memory section stores an image inside the photographic subject area as a photographic subject image. Consequently, in continuous photographing of a moving body, the size of the photographic subject area for every photographing in the continuous photographing can be changed according to change in the size of the image of the moving body with respect to an image screen of the imaging section, thereby preventing wasteful usage of a memory area of the memory section.

17 Claims, 9 Drawing Sheets

ELECTRONIC STILL CAMERA AND METHOD OF IMAGE ACQUISITION OF ELECTRONIC STILL CAMERA

This is a Continuation of application Ser. No. 11/055,117 filed Feb. 11, 2005. The disclosure of the prior application is hereby incorporated by reference herein in its entirety.

CROSS-REFERENCE TO RELATED APPLICATIONS

This application is based upon and claims the benefit of priority from Japanese Patent Application No. 2004-060341, filed on Mar. 4, 2004, the entire contents of which are incorporated herein by reference.

BACKGROUND OF THE INVENTION

1. Field of the Invention

The present invention relates to an electronic still camera which has a continuous photographing function for performing successive photographing for a plurality of times in response to a request for photographing.

2. Description of the Related Art

Recently, data size of a photographic image is showing a tendency to increase as the number of pixels of an electronic still camera increases, and it is a significant challenge to usefully use a memory area of an image storage medium for storing the photographic image. As a technique for saving the memory area of the image storage medium, a cropping function which cuts out a necessary part of the photographic image simultaneously with photographing and stores only the cut-out image in the image storage medium is known.

In Japanese Unexamined Patent Application Publication No. 2001-236497, for example, a method of automatically performing cropping or zooming operation around a main subject (photographic subject) whose image is being captured, based on contents of a photographing scene, is proposed. Further, according to a program "XV" which is developed at University of Pennsylvania in the United States, a cropped image is obtained by removing a uniform margin at the boundary of the image.

However, applying the cropping function to continuous photographing is not considered according to the conventional electronic still camera, and hence it is impossible to change the size of an area to be cut out (cropping area) for every photographing in the continuous photographing. Therefore, when a moving body is subjected to the continuous photographing, data size of its image to be stored in the image storage medium is the same in any photographing in the continuous photographing, although the size of the moving body with respect to an image screen changes over time. As a result of this, when a moving body which moves away from a photographer is subjected to the continuous photographing, for example, the size of the moving body with respect to the image screen becomes smaller over time, and hence the memory area of the image storage medium is wastefully used. Therefore, the number of recordable photographic images at the time of continuous photographing decreases. On the other hand, when a moving body which moves closer to the photographer is subjected to the continuous photographing, the size of the moving body with respect to the image screen becomes larger over time, and hence the size of the subject image may become larger than the set cropping area.

Moreover, according to the cropping methods of the Japanese Unexamined Patent Application Publication No. 2001-236497 and the program "XV", cropping of a characteristic part in the photographic image is possible, but cropping while paying attention to the moving photographic subject only is impossible.

SUMMARY OF THE INVENTION

It is an object of the present invention to provide an electronic still camera and a method of image acquisition of the electronic still camera which can avoid wasteful usage of a memory area of an image storing medium at the time of continuous photographing.

According to a mode of the present invention, a photography mode selecting section allows a photographer to select continuous photographing. An imaging section captures an image of a subject. An area setting section detects a photographic subject based on a photographic image captured by the imaging section for every photographing in the continuous photographing, and sets the size and position of a photographic subject area including the detected photographic subject, when the continuous photographing is selected by the photography mode selecting section. A memory section stores an image inside the photographic subject area as a photographic subject image.

According to such structure, at the time of continuous photographing of a moving body, the size of the photographic subject area can be changed for every photographing in the continuous photographing, according to the change in the size of the image of the moving body with respect to an image screen of the imaging section. Therefore, it is possible to reduce data size of the image to be stored in the memory section to a minimum, and avoid wasteful usage of the memory area of the memory section. In other words, the number of images storable in the memory section at the time of continuous photographing can be increased, and a photographer can reduce stress caused by limitation of the storable number at the time of photographing.

According to a preferred example of the mode of the present invention, the area setting section detects a moving photographic subject based on a difference between a photographic image at the time of previous photographing and a photographic image at the time of current photographing in the continuous photographing. By detecting the photographic subject based on the difference between the previous photographic image and the current photographic image, the moving photographic subject can be detected without fail.

According to a preferred example of the mode of the present invention, the area setting section divides the photographic image into plural areas, and sets the size and position of the photographic subject area based on luminance information of the respective areas. By using the luminance information of the photographic image, the size and position of the photographic subject area can be easily set by software processing.

According to a preferred example of the mode of the present invention, the area setting section divides the photographic image into plural areas, and sets the size and position of the photographic subject area based on contrast information of the respective areas. By using the contrast information of the photographic image, the size and position of the photographic subject area can be easily set by software processing.

According to a preferred example of the mode of the present invention, the area setting section sets the size of the photographic subject area to be equal to or greater than a predetermined value which is held in advance, irrespective of the size of a moving photographic subject. By providing the predetermined value of the size of the photographic subject area, the photographic subject area can be set to be equal to or larger than a fixed size, so that image quality of the photographic subject image can be secured.

According to a preferred example of the mode of the present invention, the memory section stores the position of the photographic subject area with respect to an image screen of the imaging section, together with the photographic subject image. Thereby, the position of the photographic subject area with respect to the image screen can be recognized easily.

According to a preferred example of the mode of the present invention, the area setting section uses a predetermined area, which is held in advance, as the photographic subject area, when a moving photographic subject cannot be detected. Therefore, when the photographic subject cannot be detected because of low-contrast of the photographic image and the like, it is possible to prevent focusing operation from being repeated and the continuous photographing from being discontinued.

According to a preferred example of the mode of the present invention, a shutter speed changing section changes shutter speed. The area setting section limits the size of the photographic subject area in response to increase in the shutter speed. Since the size of the photographic subject area is limited in response to the increase in the shutter speed, it is possible to increase the number of images storable in the memory section, when the number of images obtained per unit of time increases as the shutter speed increases.

According to a preferred example of the mode of the present invention, a continuous photographing speed changing section changes a photographing interval of the continuous photographing. The area setting section limits the size of the photographic subject area in response to shortening of the photographing interval of the continuous photographing. Since the size of the photographic subject area is limited in response to the shortening of the photographing interval of the continuous photographing, it is possible to increase the number of images storable in the memory section, when the number of images obtained per unit of time increases as the photographing interval is shortened.

According to a preferred example of the mode of the present invention, a focus detecting point decision section decides a focus detecting point of the next photographing in the continuous photographing, among a plurality of focus detecting points, in response to movement of the photographic subject.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, preferred embodiments of the present invention will be explained with reference to the drawings.

Figure 1:
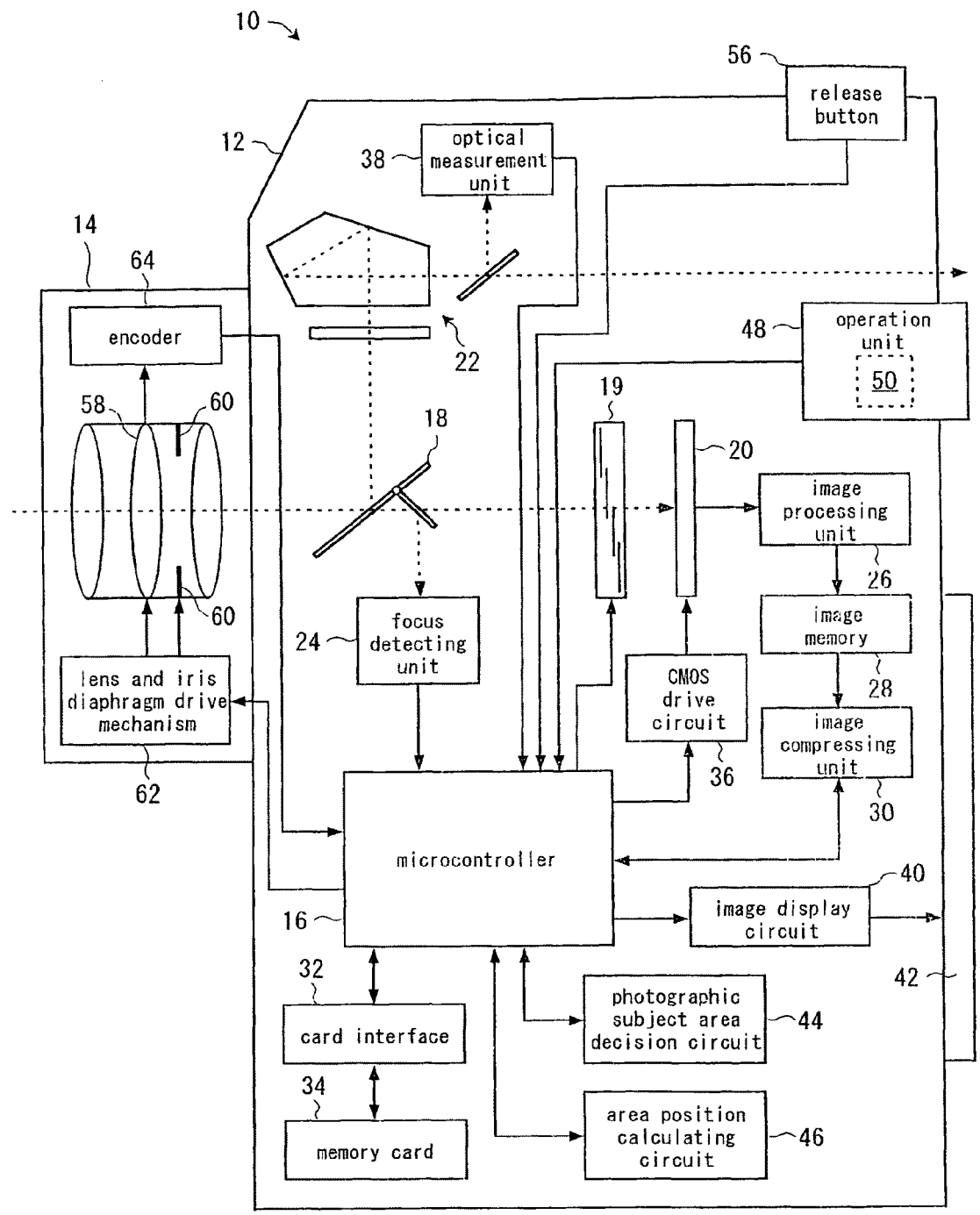
FIG. 1 is a block diagram showing a first embodiment of an electronic still camera of the present invention.

FIG. 1 shows a first embodiment of an electronic still camera of the present invention.

An electronic still camera 10 is a digital single lens reflex camera, and is constituted of a main unit 12 and a lens unit 14 which is attached to a front surface of a casing of the main unit 12.

The main unit 12 includes a microcontroller 16 for controlling the electronic still camera as a whole. In the main unit 12, a quick return mirror 18, a mechanical shutter 19, and a light-receiving surface of an imaging device 20 (CMOS sensor) for capturing an image of a subject are disposed on an optical axis of the lens unit 14. In a reflecting direction of the mirror 18 (upper side in the drawing), a finder optical system 22 is disposed. In a reflecting direction of a submirror of the mirror 18 (lower side in the drawing), a focus detecting unit 24 for detecting a focusing state of the subject image is disposed. Focus detecting data which is outputted from the focus detecting unit 24 is supplied to the microcontroller 16.

Image data outputted from the imaging device 20 (imaging section) is subjected to color signal processing, A/D conversion, gamma correction and so on by an image processing unit 26, and thereafter recorded in an image memory 28. Image data outputted from the image memory 28 is supplied to an image compressing unit 30. The image compressing unit 30 is connected to the microcontroller 16. Further, a memory card 34 (memory section) for recording images, photographing conditions and the like is detachably connected to the microcontroller 16 via a card interface 32.

A CMOS drive circuit 36 for driving the imaging device 20, an optical measurement unit 38 for performing optical measurement of luminance of the subject image, and an image display circuit 40 for controlling display of the image data recorded in the image memory 28 are connected to the microcontroller 16. Image data outputted from the image display circuit 40 is supplied to a display unit 42 (liquid crystal panel) for monitoring, which is disposed on a back surface of the casing of the main unit 12. Moreover, a photographic subject area decision circuit 44 (area setting section) for setting the size and position of a photographic subject area including a photographic subject at the time of continuous photographing, and an area position calculating circuit 46 for calculating the position of the photographic subject area with respect to an image screen of the imaging device 20 are connected to the microcontroller 16.

An operation unit 48 for setting the photographing conditions and the like, and a release button 56 for requesting photographing are provided on the casing of the main unit 12. The operation unit 48 includes a photography mode changeover switch 50 (photography mode selecting section) for allowing a photographer to select the continuous photographing. It should be noted that, although not illustrated, the operation unit 48 also includes a power switch, a rotary dial selection switch for selecting an exposure method according to a photographing scene, an image recording setting switch for setting image recording conditions at the time of photographing, a liquid crystal information display unit for displaying setting information, and so on. Outputs from the operation unit 48 and the release button 56 are respectively supplied to the microcontroller 16.

The lens unit 14 is constituted of a plurality of single lenses, and includes a focusing lens 58 which moves so that the subject image is focused on the imaging device 20, an iris 60 which is placed at a predetermined position between the lenses and is constituted of a plurality of panels for adjusting light intensity, a lens and iris diaphragm drive mechanism 62 which drives the focusing lens 58 and the iris 60 according to instructions from the microcontroller 16, and an encoder 64 which detects the position of the focusing lens 58. Incidentally, besides the focusing lens 58, the lens unit 14 also includes a not-shown zoom lens which moves for applying a zoom function, and the zoom lens is driven by instructions from a not-shown operation member via the lens and iris diaphragm drive mechanism 62.

Next, a photographing sequence of the electronic still camera 10 according to the first embodiment will be explained.

A photographer installs the memory card 34 and turns on the power switch of the operation unit 48. Then, the photographer operates the mode change-over switch 50 of the operation unit 48 to select the continuous photographing, and operates the operation unit 48 to set various photographing conditions such as image quality, recording size, white balance, sensitivity, AF area, and exposure. Further, the photographer sets the direction of the electronic still camera 10 so that a point to be focused on of the subject is in agreement with a focus detecting point at the center of an image screen.

Figure 2:
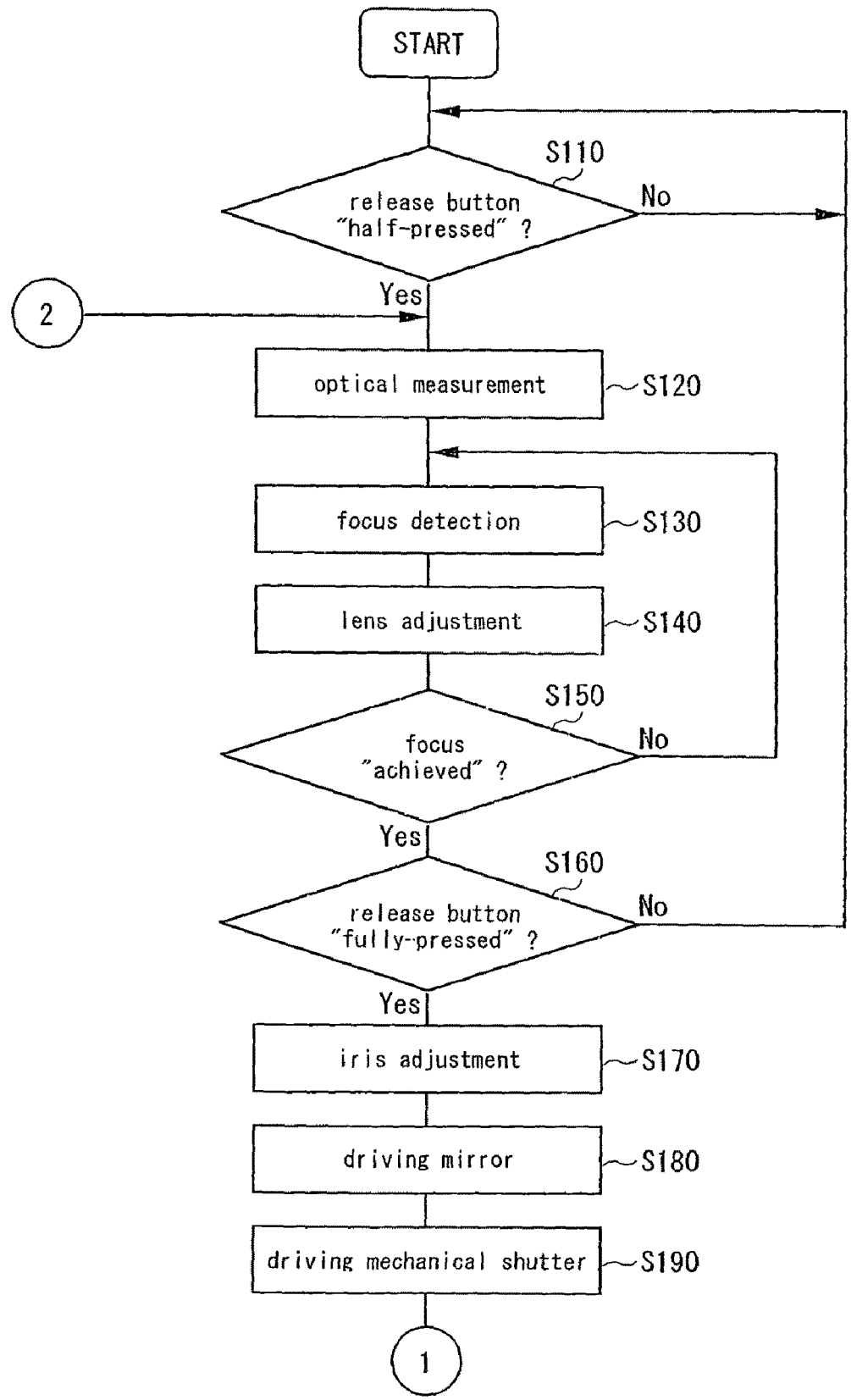
FIG. 2 is a flow chart showing photographing operation of the electronic still camera according to the first embodiment.
Figure 3:
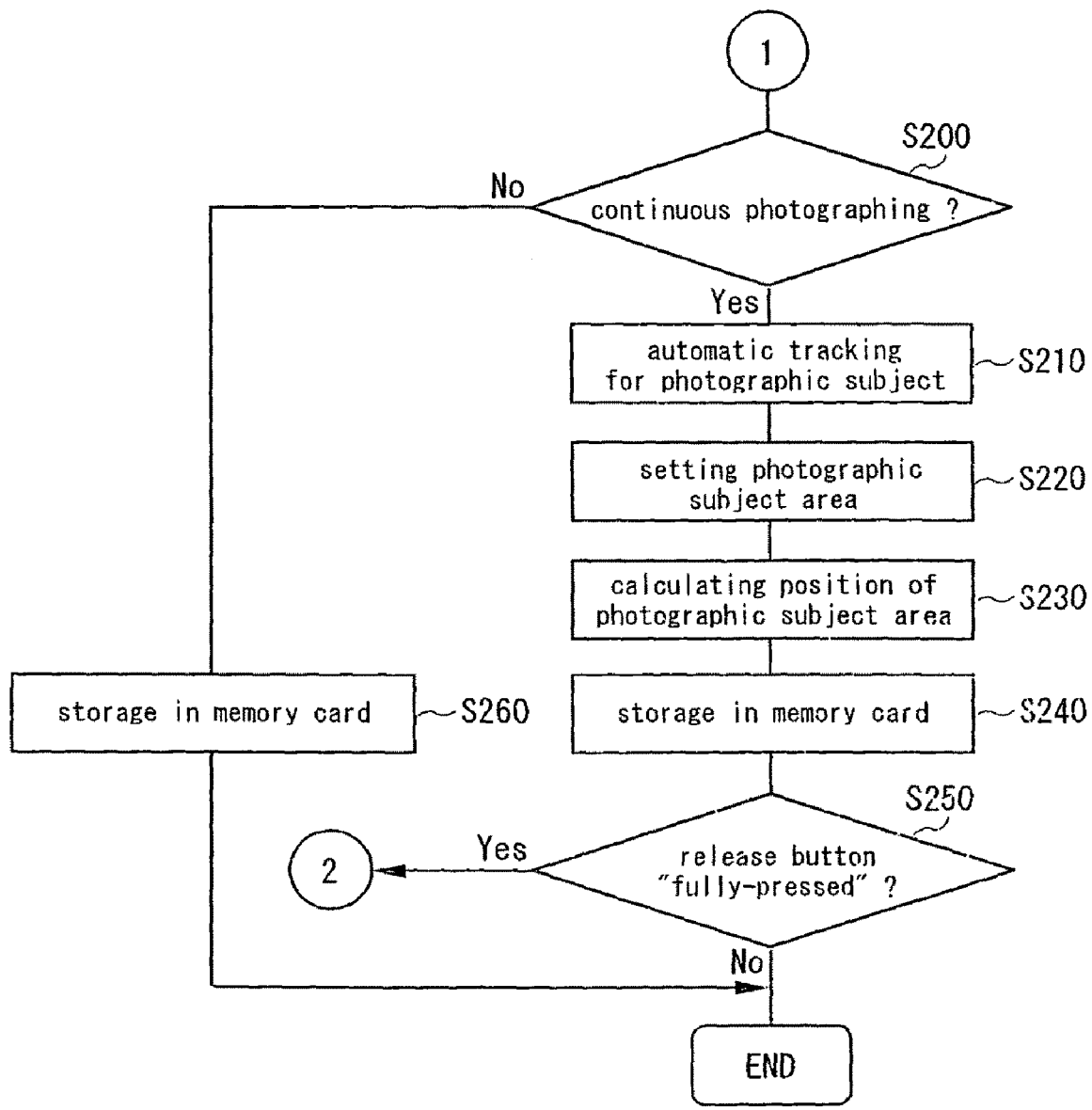
FIG. 3 is a flow chart showing the photographing operation of the electronic still camera according to the first embodiment.

FIG. 2 and FIG. 3 show photographing operation of the electronic still camera 10 according to the first embodiment.

In a step S110, the microcontroller 16 determines whether the release button 56 is in a half-pressed state or not. When the release button 56 is in the half-pressed state, processing proceeds to a step S120. When the release button 56 is not in the half-pressed state, determining operation by the microcontroller 16 is repeated.

In the step S120, the microcontroller 16 obtains the optical measurement result of luminance of the subject image by the optical measurement unit 38 (subject luminance data). Thereafter, processing proceeds to a step S130.

In the step S130, the microcontroller 16 obtains the focus detecting result by the focus detecting unit 24 (focus detecting data). Thereafter, processing proceeds to a step S140.

In the step S140, the microcontroller 16 instructs the lens and iris diaphragm drive mechanism 62 to adjust the lens based on the focus detecting data obtained in the step S130. The lens and iris diaphragm drive mechanism 62 follows the instruction from the microcontroller 16 to drive the focusing lens 58. Thereafter, processing proceeds to a step S150.

In the step S150, the microcontroller 16 determines whether focus is achieved or not. When the focus is achieved, processing proceeds to a step S160. When the focus is not achieved, processing returns to the step S130. Namely, the steps S130 to S150 are repeatedly performed until the focus is achieved.

In the step S160, the microcontroller 16 determines whether the release button 56 is in a fully-pressed state or not. When the release button 56 is in the fully-pressed state, processing proceeds to a step S170. When the release button 56 is not in the fully-pressed state, processing returns to the step S110.

In the step S170, the microcontroller 16 instructs the lens and iris diaphragm drive mechanism 62 to adjust the iris based on the subject luminance data obtained in the step S120. The lens and iris diaphragm drive mechanism 62 follows the instruction from the microcontroller 16 to drive the iris 60. Thereafter, processing proceeds to a step S180.

In the step S180, the microcontroller 16 flips the mirror 18 upward (upper side in the drawing). Thereafter, processing proceeds to a step S190.

In the step S190, the microcontroller 16 opens the mechanical shutter 19 disposed oppositely to the imaging device 20. Thereby, charge storage of the imaging device 20 is started, and a full photographic image (image of an entire image screen) is recorded in the image memory 28 via the image processing unit 26. Thereafter, processing proceeds to a step S200.

In the step S200, the microcontroller 16 determines whether the continuous photographing is selected or not. When the continuous photographing is selected, processing proceeds to a step S210. When the continuous photographing is not selected (that is, when single photographing is selected), processing proceeds to a step S260.

In the step S210, the microcontroller 16 detects a moving photographic subject by using a difference between the previous full photographic image and the current full photographic image in the continuous photographing, to thereby find a motion vector of the photographic subject. Namely, the microcontroller 16 automatically tracks the photographic subject. According to the detected photographic subject, the microcontroller 16 decides the position of a non-delete area which gives a lower limit of the size of the photographic subject area. Incidentally, at the time of first photographing in the continuous photographing, the position which is set in advance (center of the photographic image, for example) is used as the position of the non-delete area. At this time, the focus detecting point moves to the focus detecting point which is close to the point to be focused on of the moved subject, accompanying the movement of the photographic subject. Thereafter, processing proceeds to a step S220.

Figure 4A:
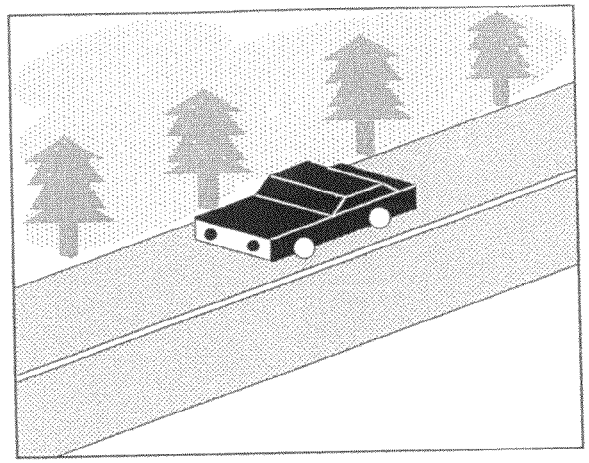
FIGS. 4(a) to 4(c) are explanatory views showing an example of a setting method of a photographic subject area at the time of continuous photographing.
Figure 4B:
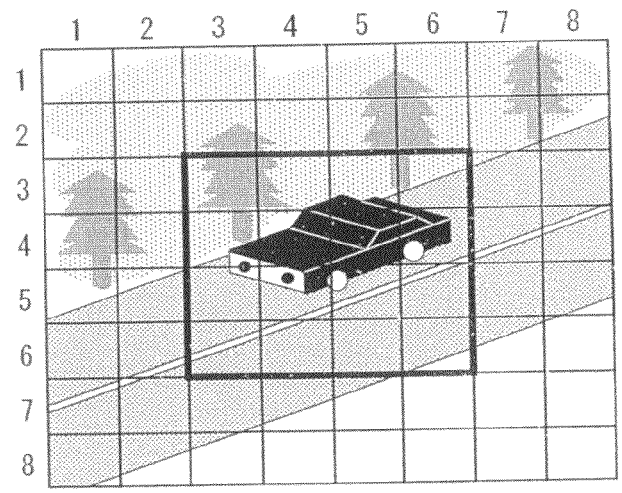
Figure 4C:
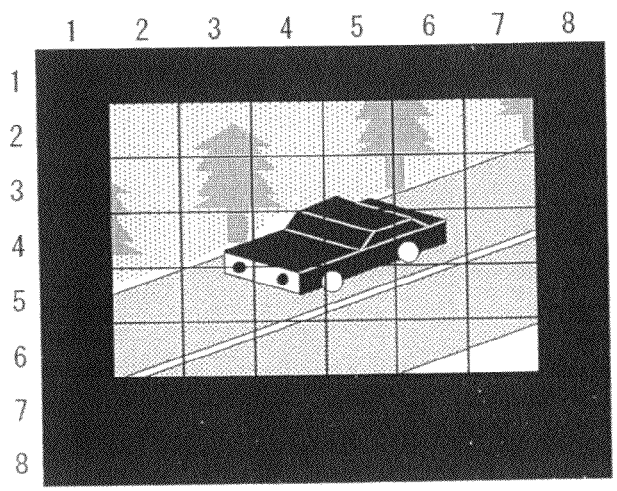

In the step S220, the microcontroller 16 instructs the photographic subject area decision circuit 44 to set the photographic subject area. The photographic subject area decision circuit 44 divides the full photographic image into plural areas, and sets the photographic subject area based on luminance information of the respective areas. The setting method of the photographic subject area will be explained in detail with reference to FIGS. 4(a) to 4(c). Thereafter, processing proceeds to a step S230.

In the step S230, the microcontroller 16 obtains the position of the photographic subject area with respect to the image screen of the imaging device 20 (position coordinates of the left upper corner, for example) from the area position calculating circuit 46. Thereafter, processing proceeds to a step S240.

In the step S240, in the case of continuous photographing, the microcontroller 16 adds the position of the photographic subject area with respect to the image screen, which is obtained in the step S230, as tag information, to the photographic subject image (image inside the photographic subject area set in the step S220) in Exif (Exchangeable Image File Format) format, and records it to the memory card 34 via the card interface 32. Thereafter, processing proceeds to a step S250.

In the step S250, the microcontroller 16 determines whether the release button 56 is in a fully-pressed state or not. When the release button 56 is in the fully-pressed state, processing returns to the step S120 and new photographing in the continuous photographing is performed. When the release button 56 is not in the fully-pressed state, the continuous photographing is completed. In other words, the continuous photographing continues as long as the release button 56 is in the fully-pressed state.

In the step S260, in the case of the single photographing, the microcontroller 16 records the full photographic image in the Exif format to the memory card 34 via the card interface 32. Thereby, the single photographing is completed.

FIGS. 4(*a*) to 4(*c*) show an example of the setting method of the photographic subject area at the time of continuous photographing.

The case where the full photographic image as shown in FIG. 4(*a*) is obtained when the continuous photographing of a moving car is performed will be explained as an example.

As shown in FIG. 4(*b*), the photographic subject area decision circuit 44 divides the area of the photographic image shown in FIG. 4(*a*) into an 8×8 matrix, and excludes unnecessary areas from the photographic subject area based on the luminance information of the respective areas, to thereby decide the size and position of the photographic subject area. Incidentally, it is supposed that the non-delete area set in the step S210 in FIG. 3 (for example, a rectangular area constituted of the areas A(3,3) to A(6,6) shown in the bold line in FIG. 4(*b*)) is not excluded from the photographic subject area.

First, the photographic subject area decision circuit 44 calculates average luminance values L(1,1) to L(8,8) of the respective areas A(1,1) to A(8,8), respectively. The average luminance value of the area can be found from the result of integration of a graph obtained by assuming a horizontal axis to be the luminance from 0 to 255 (8-bit gradation), and a vertical axis to be the number of pixels (frequency). Incidentally, the area which is in the m-th column from the left and the n-th row from the top in the drawing is represented as A(m,n), and the average luminance value of the area A(m,n) is represented as L(m,n).

Next, the photographic subject area decision circuit 44 uses the following expression (1) to find an average value LY(n) of the average luminance values L(1,n) to L(8,n) of the areas in the n-th column A(1,n) to A(8,n).

$$LY(n)=\{L(1,n)+L(2,n)+\ldots+L(7,n)+L(8,n)\}/8 \quad (1)$$

Then, the photographic subject area decision circuit 44 uses the following expression (2) to find an absolute value |ΔLY(m,n)| of a difference between the average value LY(n) and the average luminance values L(1,n) to L(8,n).

$$|\Delta LY(m,n)|=LY(n)-L(m,n), m=1,2,\ldots,7,8 \quad (2)$$

Thereafter, when all of |ΔLY(1,n)| to |ΔLY(8,n)| are equal to or smaller than 30, for example, the photographic subject area decision circuit 44 excludes the areas in the n-th row A(1,n) to A(8,n) from the photographic subject area. More specifically, the photographic subject area decision circuit 44 does not exclude the areas in the n-th row A(1,n) to A(8,n) from the photographic subject area when at least one of |ΔLY(1,n)| to |ΔLY(8,n)| is greater than 30. In FIG. 4(*b*), for example, the areas in the first row A(1,1) to A(8,1), the areas in the seventh row A(1,7) to A(8,7) and the areas in the eighth row A(1,8) to A(8,8) are excluded from the photographic subject area.

Next, the photographic subject area decision circuit 44 uses the following expression (3) to find an average value LX(m) of the average luminance values L(m,2) to L(m,6) of the areas A(m,2) to A(m,6), which are the areas in the m-th column A(m,1) to A(m,8) except for the already-excluded areas A(m,1), A(m,7) and A(m,8).

$$LX(m)=\{L(m,2)+L(m,3)+L(m,4)+L(m,5)+L(m,6)\}/5 \quad (3)$$

Then, the photographic subject area decision circuit 44 uses the following expression (4) to find an absolute value |ΔLX(m,n)| of a difference between the average value LX(m) and the average luminance values L(m,2) to L(m, 6).

$$|\Delta LX(m,n)|=LX(m)-L(m,n), n=2,3,4,5,6 \quad (4)$$

Thereafter, when all of |ΔLX(m,2)| to |ΔLX(m,6)| are equal to or smaller than 30, for example, the photographic subject area decision circuit 44 excludes the areas in the m-th column A(m,2) to A(m,6) from the photographic subject area. More specifically, the photographic subject area decision circuit 44 does not exclude the areas in the m-th column A(m,2) to A(m,6) from the photographic subject area when at least one of |ΔLX(m,2)| to |ΔLX(m,6)| is greater than 30. In FIG. 4(*b*), the areas in the first column A(1,2) to A(1,6), and the areas in the eighth column A(8,2) to A(8,6) are excluded from the photographic subject area.

Thus, the photographic subject area decision circuit 44 decides the size and position of the photographic subject area (the part not being filled in with black in the drawing) including the photographic subject (moving car) as shown in FIG. 4(*c*). Incidentally, the photographic subject area may be set using contrast information of the respective areas, instead of the luminance information of the respective areas. Moreover, a slice level for area exclusion (30 in the above example) may be set arbitrarily, or the slice level may be set for each area according to shading characteristics by an imaging optical system or the like. Furthermore, the areas in the n-th row (or in the m-th column) may be excluded from the photographic subject area when the number of areas whose |ΔLY(m,n)| (or |ΔLX(m,n)|) is equal to or smaller than the slice level in the n-th row (or in m-th column) is equal to or greater than a predetermined number.

The following effects can be obtained according to the above-described first embodiment.

At the time of continuous photographing of a moving body, the size of the photographic subject area can be changed for every photographing of the continuous photographing, according to the change in the size of the image of the moving body with respect to the image screen of the imaging device 20. Therefore, it is possible to reduce data size of the image to be recorded in the memory card 34 to a minimum, and avoid wasteful usage of a memory area of the memory card 34. In other words, it is possible to increase the number of images recordable in the memory card 34 at the time of continuous photographing. Further, since zoom processing of the moving photographic subject can be performed without operating the lens unit 14 or the operation unit 48 of the electronic still camera 10, it is possible to reduce the possibility that camera shake is caused.

Since the luminance information of the photographic image is used, it is possible to easily set the size and position of the photographic subject area by software processing.

By providing the non-delete area which gives the lower limit of the size of the photographic subject area, the size of the photographic subject area can be set to be equal to or larger than a fixed size even when the size of the image of the moving body is small, so that the image quality of the photographic subject area can be secured.

Figure 5:
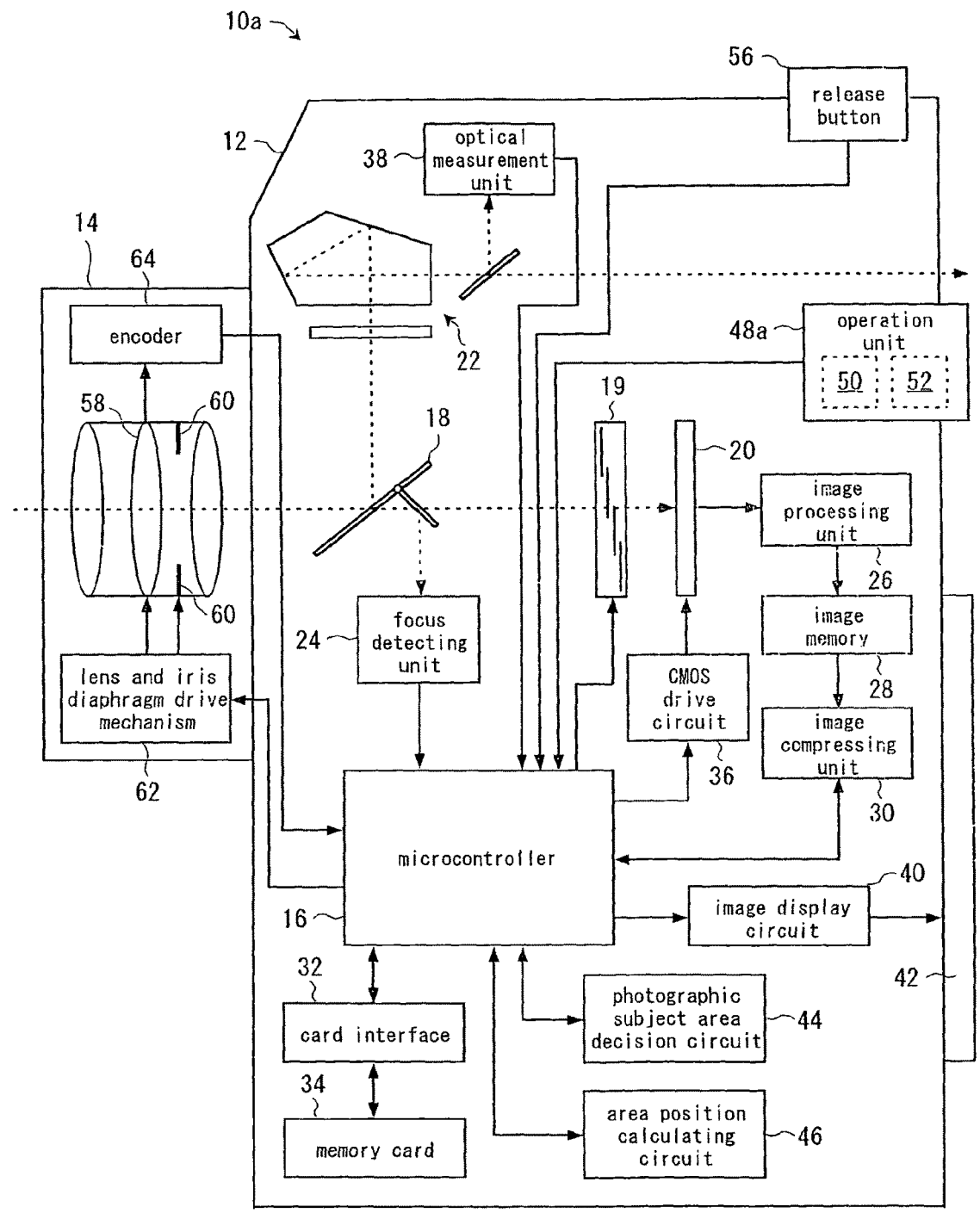
FIG. 5 is a block diagram showing a second embodiment of the electronic still camera of the present invention.

FIG. 5 shows a second embodiment of the electronic still camera of the present invention. Incidentally, the same numerals and symbols are given to designate the same elements as those explained in the first embodiment, and detailed explanations thereof will be omitted.

An electronic still camera 10*a* includes an operation unit 48*a* instead of the operation unit 48 (FIG. 1) in the first embodiment. The operation unit 48*a* is constituted by adding a shutter speed change-over switch 52 (shutter speed changing section), which sets the shutter speed at either "high speed" or "standard speed", to the operation unit 48 in the first embodiment. The rest of the structure of the electronic still camera 10a is the same as that of the electronic still camera 10 (FIG. 1) in the first embodiment.

Figure 6:
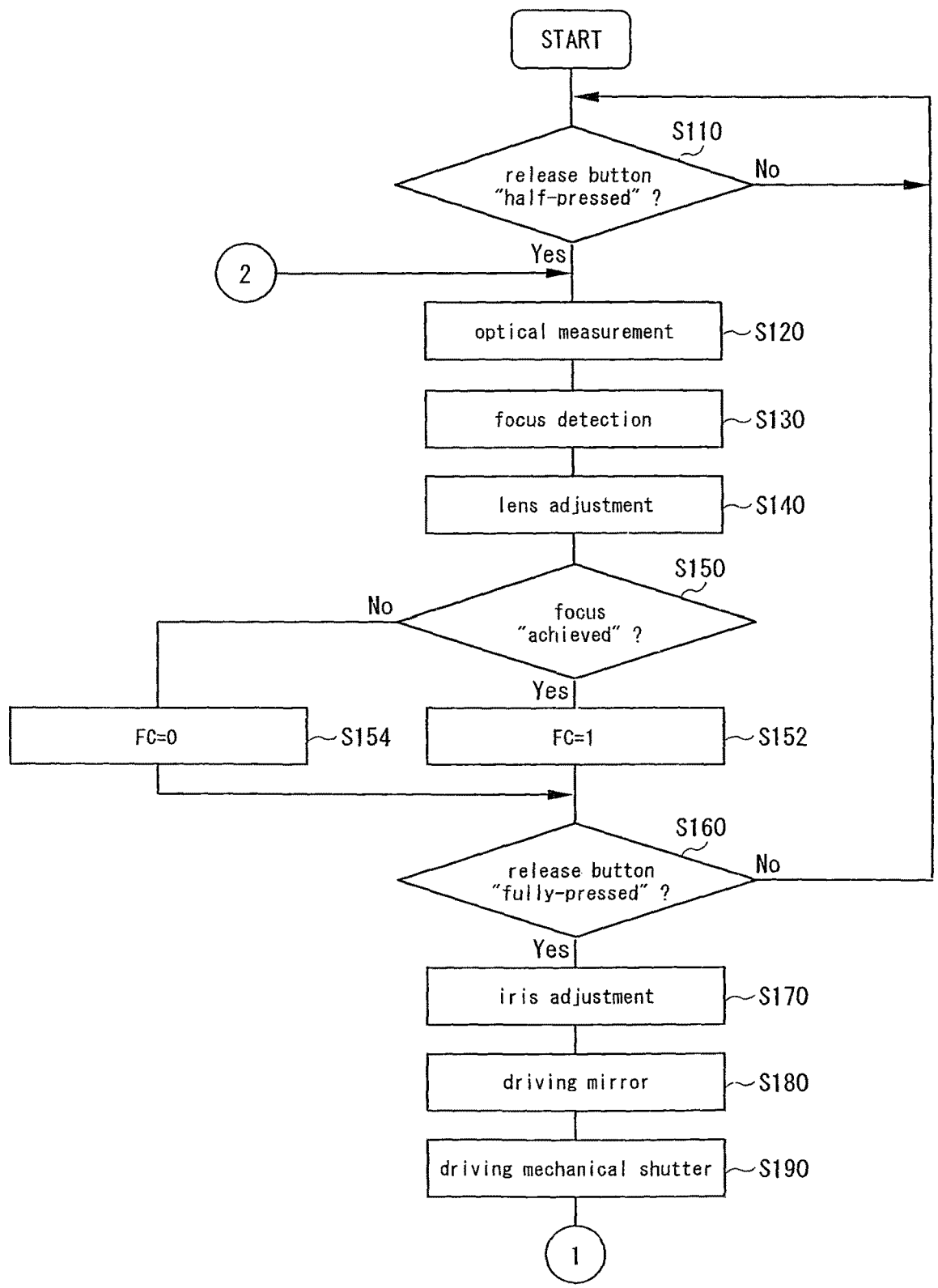
FIG. 6 is a flow chart showing photographing operation of the electronic still camera according to the second embodiment.
Figure 7:
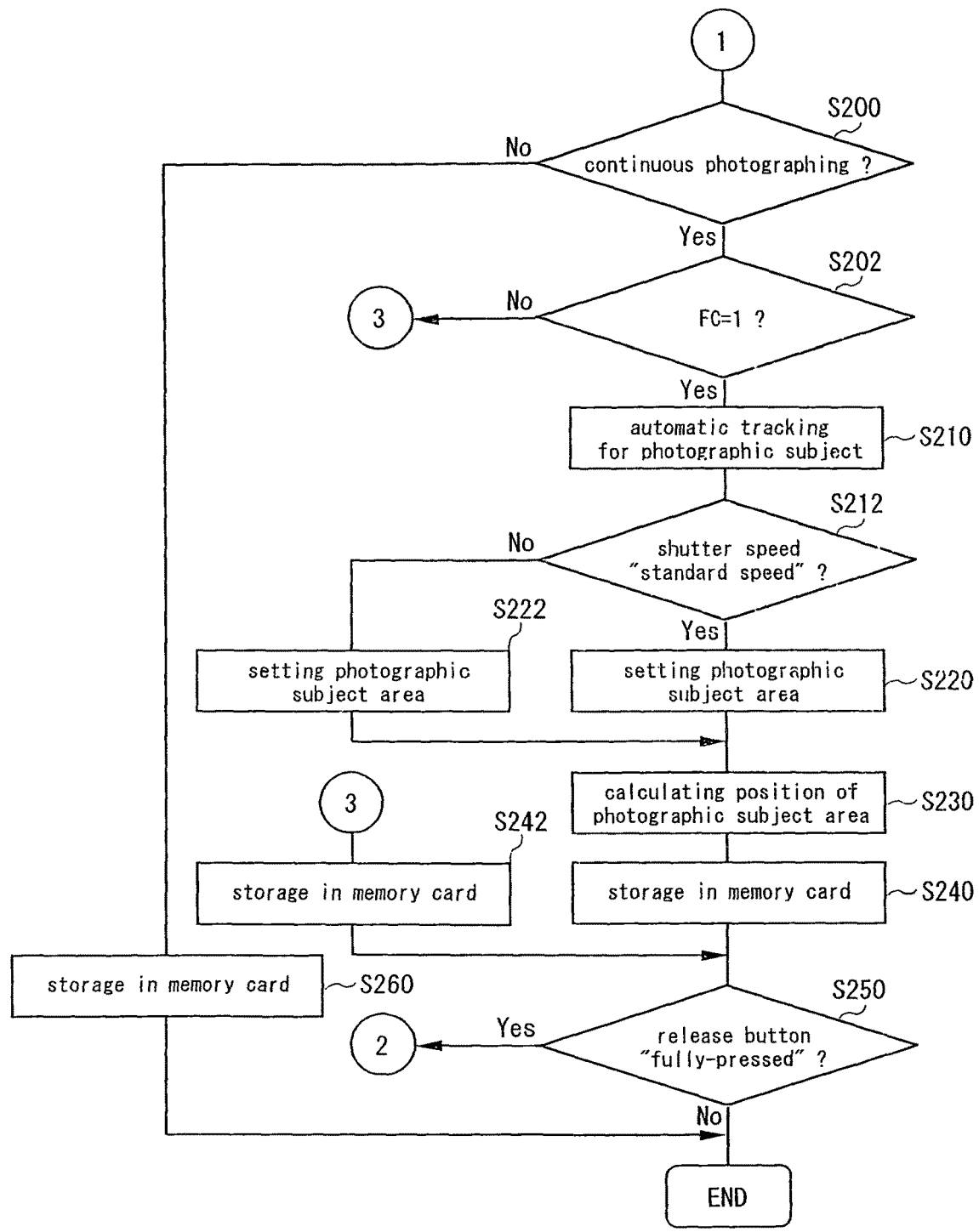
FIG. 7 is a flow chart showing the photographing operation of the electronic still camera according to the second embodiment.

FIG. 6 and FIG. 7 show photographing operation of the electronic still camera 10a according to the second embodiment.

Similarly to the first embodiment (FIG. 2), steps S110 to S140 are performed according to operation by a photographer.

In a step S152, a microcontroller 16 sets a flag FC at "1" when it is determined that focus is achieved in a step S150. Thereafter, processing proceeds to a step S160.

In a step S154, the microcontroller 16 resets the flag FC to "0" when it is determined that the focus is not achieved in the step S150. Thereafter, processing proceeds to the step S160. Then, similarly to the first embodiment (FIG. 2 and FIG. 3), steps S160 to S200 are performed according to operation by the photographer.

In a step S202, the microcontroller 16 determines whether the flag FC is "1" or not. When the flag FC is "1", processing proceeds to a step S210. In the step S210, the same processing as that in the step S210 in the first embodiment is performed. When the flag FC is "0", processing proceeds to a step S242.

In a step S212 (after performing the step S210), the microcontroller 16 determines whether the shutter speed is set at the "standard speed" or not. When the shutter speed is set at the "standard speed", processing proceeds to a step S220, where a photographic subject area is set by the same method as that in the first embodiment. When the shutter speed is not set at the "standard speed" (when the shutter speed is set at the "high speed"), processing proceeds to a step S222.

In the step S222, when the shutter speed is set at the "high speed", the microcontroller 16 uses a non-delete area which is set in the step S210 as the photographic subject area, and limits the size of the photographic subject area. Thereafter, processing in and after a step S230 are performed according to operation by the photographer, similarly to the first embodiment.

In the step S242, when the flag FC is "0", the microcontroller 16 records a full photographic image as a photographic subject image to a memory card 34 via a card interface 32 in Exif format. In other words, when a photographic subject cannot be detected, the microcontroller 16 uses an entire image screen as the photographic subject area. Thereafter, processing in and after a step S250 are performed similarly to the first embodiment.

The same effects as those of the first embodiment can be obtained according to the above-described second embodiment as well. Further, when the focus is not achieved, that is, when the photographic subject cannot be detected, it is possible to prevent focusing operation from being repeated by regarding the entire image screen as the photographic subject area. As a result of this, at the time of continuous photographing, photographing by a predetermined number of times within a predetermined time can be performed without fail.

When the shutter speed is set at the "high speed" by the photographer, the non-delete area is set as the photographic subject area, so that the number of images storable in the memory card 34 at the time of continuous photographing can be increased.

Figure 8:
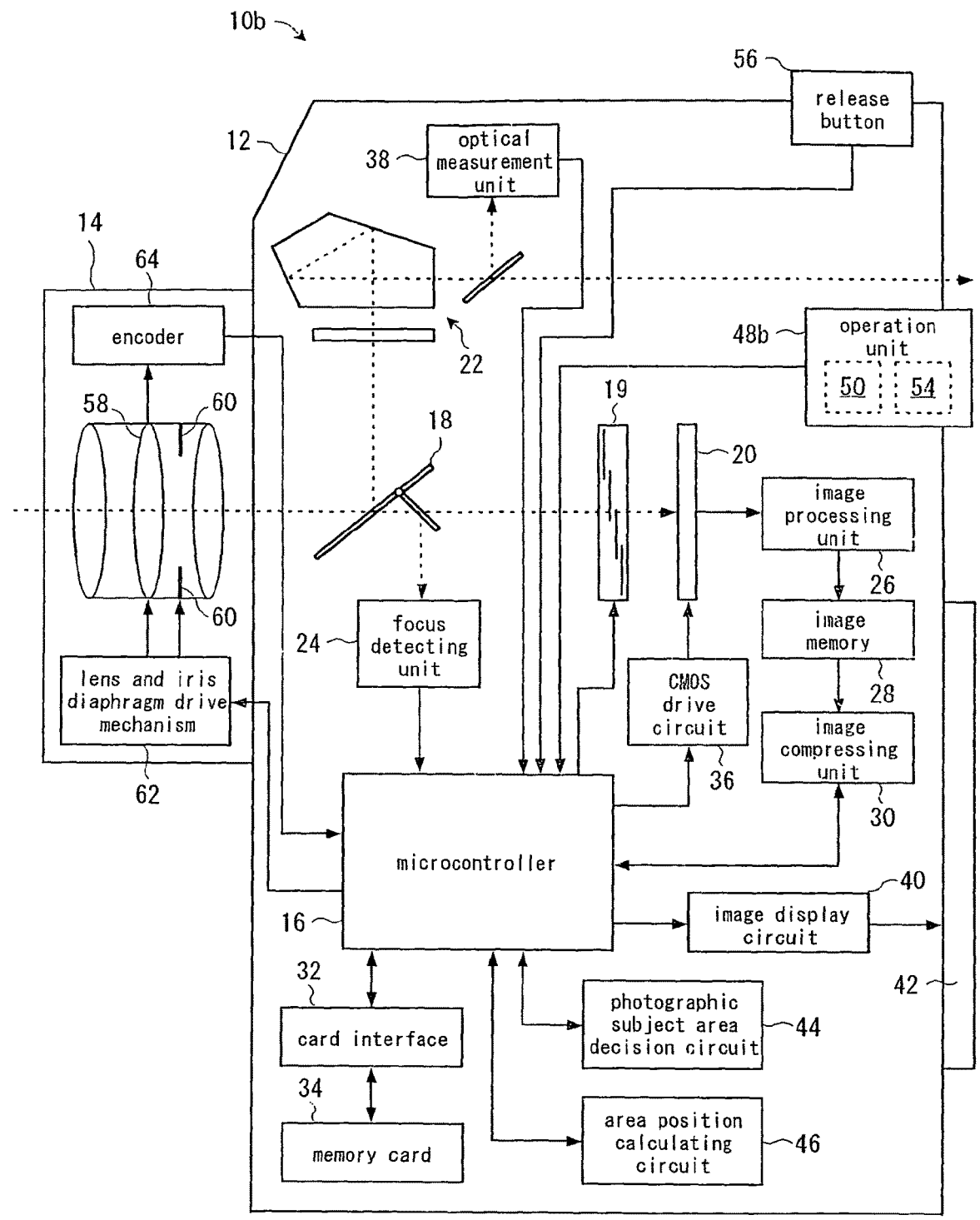
FIG. 8 is a block diagram showing a third embodiment of the electronic still camera of the present invention.

FIG. 8 shows a third embodiment of the electronic still camera of the present invention. Incidentally, the same numerals and symbols are given to designate the same elements as those explained in the first embodiment, and detailed explanations thereof will be omitted.

An electronic still camera 10b includes an operation unit 48b instead of the operation unit 48 (FIG. 1) in the first embodiment. The operation unit 48b is constituted by adding a continuous photographing speed change-over switch 54 (continuous photographing speed changing section), which sets a photographing interval of the continuous photographing (continuous photographing speed) at either "high speed" or "standard speed", to the operation unit 48 in the first embodiment. The rest of the structure of the electronic still camera 10b is the same as that of the electronic still camera 10 (FIG. 1) in the first embodiment.

Figure 9:
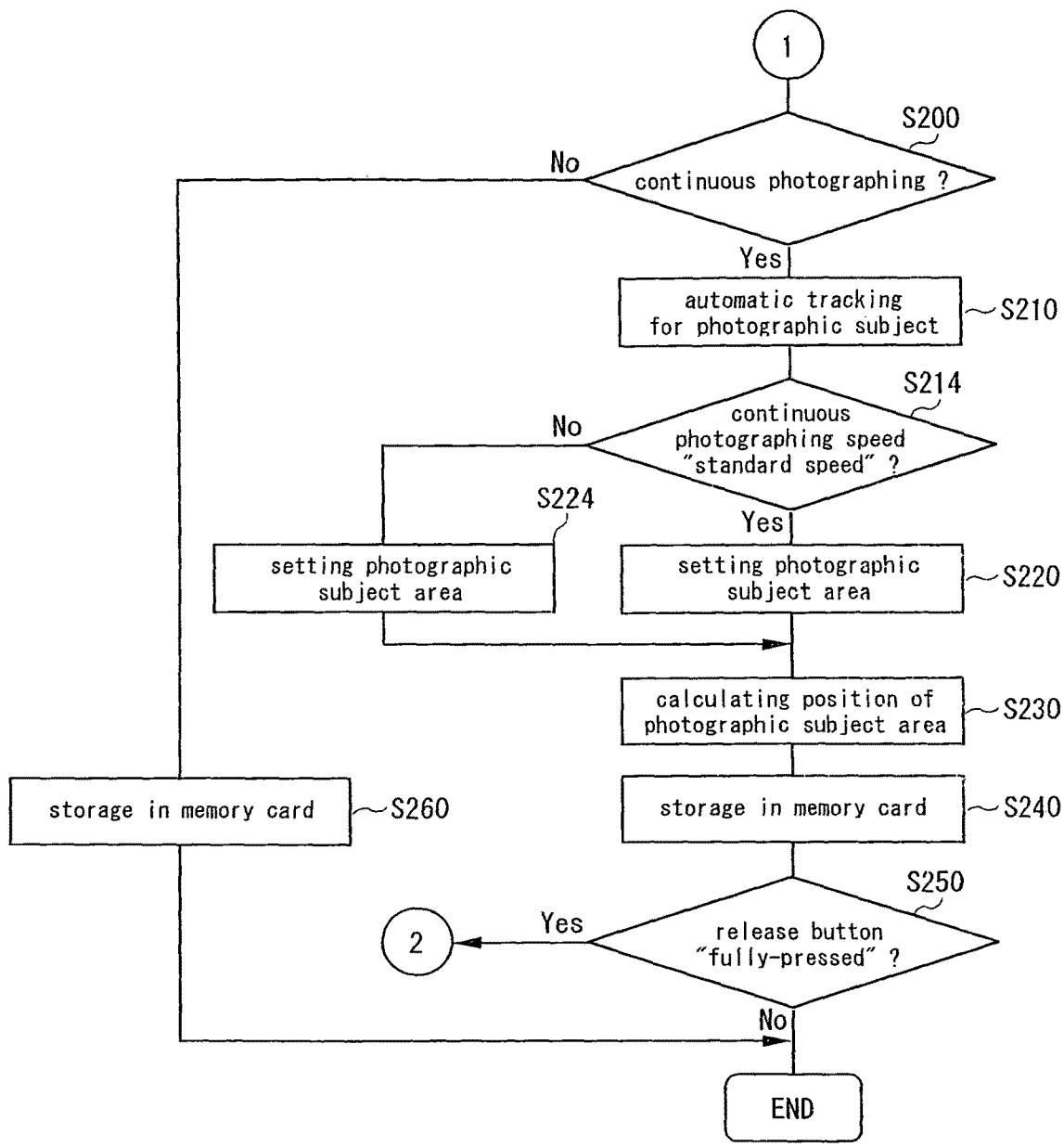
FIG. 9 is a flow chart showing photographing operation of the electronic still camera according to the third embodiment.

FIG. 9 shows operation of the electronic still camera 10b according to the third embodiment. Incidentally, processing in steps S110 to S190 in the third embodiment are the same as those in the first embodiment (FIG. 2), and hence illustration thereof will be omitted.

First, similarly to the first embodiment (FIG. 2 and FIG. 3), steps S110 to S210 are performed according to operation by a photographer.

In a step S214 (after performing the step S210), a microcontroller 16 determines whether the continuous photographing speed (photographing interval of the continuous photographing) is set at the "standard speed" or not. When the continuous photographing speed is set at the "standard speed", processing proceeds to a step S220, where a photographic subject area is set by the same method as that in the first embodiment. When the continuous photographing speed is not set at the "standard speed" (when the continuous photographing speed is set at the "high speed"), processing proceeds to a step S224.

In the step S224, when the continuous photographing speed is set at the "high speed", the microcontroller 16 uses a non-delete area which is set in the step S210 as the photographic subject area, and limits the size of the photographic subject area. Thereafter, processing in and after a step S230 are performed according to operation by the photographer, similarly to the first embodiment.

The same effects as those of the first embodiment can be obtained according to the above-described third embodiment as well. Further, when the photographing interval of the continuous photographing is shortened by the photographer, the non-delete area is set as the photographic subject area, so that the number of images storable in a memory card 34 at the time of continuous photographing can be increased.

Incidentally, according to the first to third embodiments, the example of applying the present invention to the digital single lens reflex camera is explained. The present invention is not limited to such embodiments. For example, the present invention may be applied to the so-called digital compact camera which displays an image of a subject before photographing on an LCD (Liquid Crystal Display).

According to the first to third embodiments, the example of applying the present invention to the electronic still camera is explained. The present invention is not limited to such embodiments. For example, the present invention may be applied to a digital camera function of portable equipment such as a cellular phone and a PDA (Personal Digital Assistant).

According to the first to third embodiments, the example of employing the CMOS sensor as the imaging device is explained. The present invention is not limited to such embodiments. For example, a CCD (Charge Coupled Device) sensor may be used as the imaging device, or a random-access imaging device other than the CMOS sensor, which can select any XY address, may be employed.

According to the first to third embodiments, the example in which the mechanical shutter 19 is disposed between the lens unit 14 and the imaging device 20 is explained. The present invention is not limited to such embodiments. For example, when the imaging device 20 has an electronic shutter function, the mechanical shutter 19 may be omitted. In other words, the mechanical shutter 19 is necessary when the imaging device 20 does not have the electronic shutter function.

According to the first to third embodiments, the example of providing the non-delete area which gives the lower limit of the size of the photographic subject area is explained. The present invention is not limited to such embodiments. For example, when it is unnecessary to set the size of the photographic subject area to be equal to or larger than a fixed size, the same effects can be obtained even if the non-delete area is not provided thereto.

The invention is not limited to the above embodiments and various modifications may be made without departing from the spirit and scope of the invention. Any improvement may be made in part or all of the components.

What is claimed is:

1. An electronic still camera comprising:
    a photography mode selecting section allowing a photographer to select continuous photographing;
    an imaging section capturing an image of a subject;
    a photographic subject detecting section detecting a photographic subject based on a photographic image captured by the imaging section for every photograph;
    a non-delete area setting section setting a non-delete area including the detected photographic subject detected by the photographic subject detecting section;
    an area setting section dividing the photographic image into a plurality of blocks, and sorting blocks not being set as the non-delete area by the non-delete area setting section into an exclude area and a non-exclude area is an expansion to the non-delete area based on luminance information of each of the blocks not being set as the non-delete area; and
    a memory section storing an image inside the non-delete area and the non-exclude area as a photographic subject image.

2. The electronic still camera according to claim 1, wherein the photographic subject detecting section detects a moving photographic subject based on a difference between a photographic image captured at a time of previous photographing and a photographic image captured at a time of current photographing in a continuous photographing mode.

3. The electronic still camera according to claim 1, wherein the memory section stores a position of the non-delete area and the non-exclude area with respect to an image screen of the imaging section, together with the photographic subject image.

4. The electronic still camera according to claim 1, wherein the memory section stores an image inside a predetermined area which is held in advance, as the photographic subject image, when a moving photographic subject cannot be detected.

5. The electronic still camera according to claim 1, further comprising:
    a shutter speed changing section changing shutter speed, wherein
    the memory section stores an image inside the non-delete area as the photographic subject image in response to increase in the shutter speed.

6. The electronic still camera according to claim 1, further comprising:
    a photographing interval changing section changing a photographing interval of the continuous photographing, wherein
    the memory section stores an image inside the non-delete area as the photographic subject image in response to shortening of the photographing interval of the continuous photographing.

7. The electronic still camera according to claim 1, further comprising:
    a focus detecting point decision section deciding a focus detecting point of a next photograph in a continuous photographing mode, among a plurality of focus detecting points, in response to movement of the photographic subject.

8. The electronic still camera according to claim 1, wherein
    the photographic subject detecting section detects a photographic subject for each of first still images captured continuously;
    the non-delete area setting section sets a non-delete area including the photographic subject for each of the first still images;
    the area setting section sorts blocks not being set as the non-delete area into an exclude area and a non-exclude area for each of the first still images; and
    the memory section stores each image inside the non-delete area and the non-exclude area of each of the first still images as a second still image.

9. A method of image acquisition of an electronic still camera, comprising:
    detecting a photographic subject based on a captured photographic image for every photograph;
    setting a non-delete area including the detected photographic subject;
    dividing the photographic image into a plurality of blocks, and sorting blocks not being set as the non-delete area into an exclude area and a non-exclude area is an expansion to the non-delete area based on luminance information of each of the blocks not being set as the non-delete area; and
    storing an image inside the non-delete area and the non-exclude area as a photographic subject image.

10. The method of image acquisition of the electronic still camera according to claim 9, wherein
    a moving photographic subject is detected based on a difference between a photographic image captured at a time of previous photographing and a photographic image captured at a time of current photographing in a continuous photographing mode.

11. The method of image acquisition of the electronic still camera according to claim 9, wherein
    a position of the non-delete area and the non-exclude area with respect to an image screen is stored together with the photographic subject image.

12. The method of image acquisition of the electronic still camera according to claim 9, wherein
    an image inside a predetermined area which is held in advance is stored as the photographic subject image, when a moving photographic subject cannot be detected.

13. The method of image acquisition of the electronic still camera according to claim 9, wherein
    an image inside the non-delete area is stored as the photographic subject image in response to increase in shutter speed.

14. The method of image acquisition of the electronic still camera according to claim 9, wherein an image inside the non-delete area is stored as the photographic subject image in response to shortening of a photographing interval of continuous photographing.

15. The method of image acquisition of the electronic still camera according to claim 9, wherein a focus detecting point of a next photograph in a continuous photographing mode is decided among a plurality of focus detecting points, in response to movement of the photographic subject.

16. An electronic still camera comprising:

a photography mode selecting section allowing a photographer to select continuous photographing;

an imaging section capturing an image of a subject;

a photographic subject detecting section detecting a photographic subject based on a photographic image captured by the imaging section for every photograph;

a non-delete area setting section setting a non-delete area including the detected photographic subject detected by the photographic subject detecting section;

an area setting section dividing the photographic image into a plurality of blocks, and sorting blocks not being set as the non-delete area by the non-delete area setting section into an exclude area and a non-exclude area is an expansion to the non-delete area based on contrast information of each of the blocks not being set as the non-delete area; and a memory section storing an image inside the non-delete area and the non-exclude area as a photographic subject image.

17. A method of image acquisition of an electronic still camera, comprising:

detecting a photographic subject based on a captured photographic image for every photograph;

setting a non-delete area including the detected photographic subject;

dividing the photographic image into a plurality of blocks, and sorting blocks not being set as the non-delete area into an exclude area and a non-exclude area is an expansion to the non-delete area based on contrast information of each of the blocks not being set as the non-delete area; and storing an image inside the non-delete area and the non-exclude area as a photographic subject image.

\* \* \* \* \*